ELECTROKINETIC WEIGHING APPARATUS

Original Filed Dec. 23, 1963

INVENTORS.
DONALD L. KLASS
ROBERT M. HAINES
ROBERT B. McEUEN
THOMAS W. MARTINEK
Edward H Lang
ATTORNEY.

United States Patent Office

Re. 26,586
Reissued May 27, 1969

26,586

ELECTROKINETIC WEIGHING APPARATUS

Donald L. Klass, Barrington, Ill., and Robert M. Haines, Placentia, and Robert B. McEuen, La Habra, Calif., and Thomas W. Martinek, Danville, Ill., assignors, by mesne assignments, to Union Oil Company of California, Los Angeles, Calif., a corporation of California Original No. 3,196,963, dated July 27, 1965, Ser. No. 332,484, Dec. 23, 1963. Application for reissue Sept. 21, 1966, Ser. No. 586,917

The portion of the term of the patent subsequent to July 27, 1982, has been disclaimed Int. Cl. G01g *9/00*

U.S. Cl. 177—1 19 Claims

Matter enclosed in heavy brackets [ ] appears in the original patent but forms no part of this reissue specification; matter printed in italics indicates the additions made by reissue.

*ABSTRACT OF THE DISCLOSURE*

*An apparatus for determining the rate of movement of an object comprising (1) two spaced members having electrically conducting opposing surfaces, one of said surfaces being movable relative to the other, (2) a shear-responsive liquid, which exhibits electrokinetic properties when sheared, confined between the spaced members, (3) movable support means, for supporting the object, operatively connected to the movable member so as to cause movement of the movable member in response to the rate of movement of the object and (4) electrical circuit means responsive to the electrokinetic property of the liquid connected to the electrically conducting opposing surfaces. The invention also relates to a method for determining the rate of movement of an object utilizing the apparatus.*

This invention is based on a novel apparatus and method utilizing the electrokinetic properties of a shear-responsive liquid to weight objects.

A number of electrical phenomena are exhibited when suspensions of certain solids in oils are subjected to shear stresses. When a suspension of non-conducting particles in an oleaginous vehicle of relatively low dielectric constant, such as a dispersion of silica in a mineral oil, is subjected to shear stress, as between opposing surfaces of two bodies moving with respect to each other, the dispersion exhibits changes in electrical properties, such as a decrease in D.C. resistance, a change in dielectric constant, and/or the generation of an induced potential. The magnitude of each of these phenomena depends upon the dispersion composition, the shear rate, the temperature, and the spacing between the opposing surfaces. The magnitude of the induced potential depends also upon the compositions of the opposing surfaces. For the purpose of this application, such suspensions are hereinafter designed "shear-responsive" or "electrodynamic" liquids or fluids and the change in electrical properties above referred to are hereinafter designated as the "electrokinetic properties" of the liquids or fluids.

In accordance with this invention, a film of a shear-responsive liquid is disposed in the space between two relatively movable members. An object to be weighed is mechanically connected to one of the members such that the speed of relative movement of the two members is dependent upon the weight of the object. The weight of the object is then determined, using suitable electrical apparatus, as a function of the change in an electrokinetic property, e.g., potential generated, of the shear-responsive liquid.

It is therefore an object of this invention to provide an apparatus and method utilizing a shear-responsive liquid for weighing objects.

Another object of this invention is to provide an apparatus and method wherein a change in an electrokinetic property of a shear-responsive liquid is used to indicate the weight of objects.

Still another object of this invention is to provide an apparatus and method for weighing objects wherein an object to be weighed is mechanically connected between two spaced relatively movable members confining a shear-responsive liquid so that the shear stress applied to the shear-responsive liquid is dependent on the weight of the object.

Figure 1:
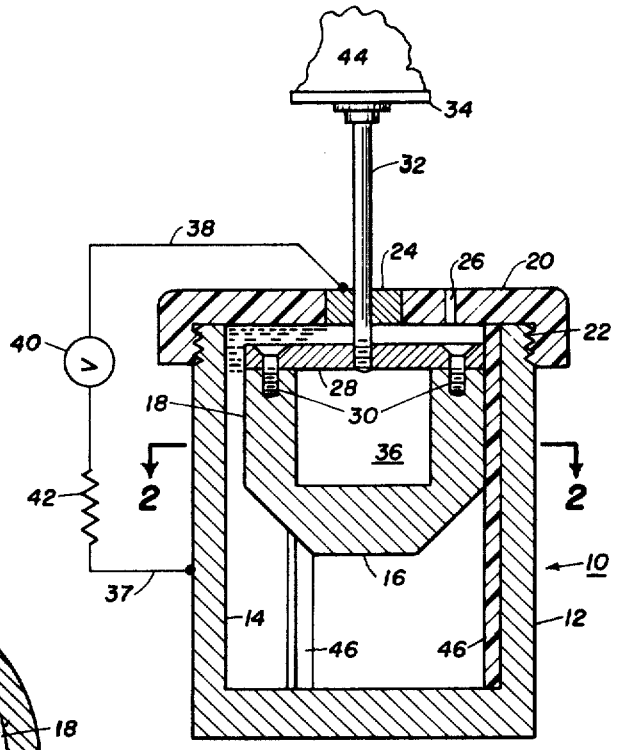
Figure 3:
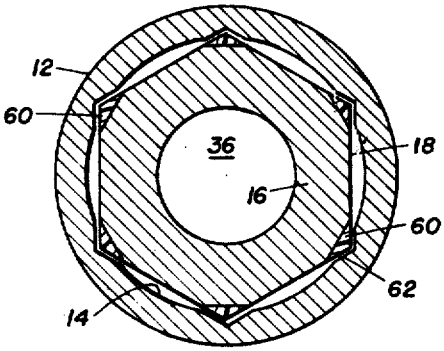
Figure 2:
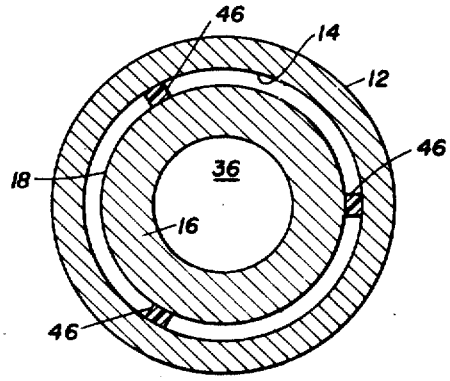
Figure 4:
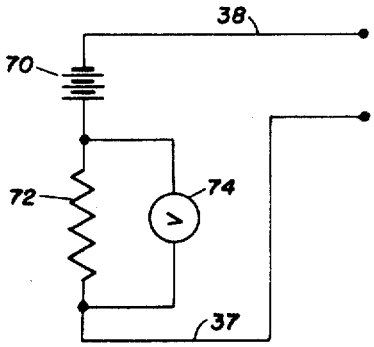

These and further objects of this invention will become apparent or be described as the description thereof herein proceeds and reference is made to the accompanying drawings in which:

FIGURE 1 is an elevational view, partly schematic and partly in section, one embodiment of the apparatus of this invention, FIGURE 2 is a sectional view in the plane 2—2 of FIGURE 1, FIGURE 3 is a sectional view of an alternative embodiment of the apparatus of this invention, and FIGURE 4 is a schematic view of an alternative indicating circuit.

Referring to FIGURES 1 and 2, the reference numeral 10 designates a vertical, electrically conductive, cylindrical vessel which includes cup-shaped portion 12 containing a shear-responsive liquid and has cylindrical interior surface 14. Disposed in the shear-responsive fluid for reciprocal movement within cylindrical vessel 10 is piston 16 having electrically conductive cylindrical surface 18. The diameter of surface 18 is less than the diameter of surface 14 to form an annular space therebetween. The space between surfaces 14 and 18 is preferably about 0.005 to 0.100 inch, although other spacings may be used. While the distance that piston 16 is reciprocally movable within vessel 10 is not critical, it is preferred that the relative sizes of cylindrical vessel 10 and piston 16 be such that piston 16 will move downwardly a distance of at least about 0.5 inch.

Cylindrical vessel 10 also includes cover portion 20, which is secured to cup-shaped portion 12 by threads 22. Cover portion 20 is fabricated of an electrically insulating material, such as Teflon, nylon, Bakelite, etc. Disposed substantially in the center of cover 20 is electrically conductive bushing 24. Cover 20 also preferably includes vent opening 26 to relieve pressure when cover 20 is secured in place.

Supported by cover plate 28, which is held in place on piston 16 by bolts 30, is electrically conductive rod 32. Rod 32, which extends through and is slidably held by bushing 24 in electrically conductive relationship therewith, supports weighing pan 34 on the extended end thereof. The weight of piston 16 is adjusted by varying the size of hollow 36 so that the total weight of the movable assembly including piston 16, rod 32, and weighing pan 34 is such that piston 16 will float in the shear-responsive liquid disposed within cylindrical vessel 10. Preferably, the weight of piston 16 is adjusted so that piston 16 will just float in the shear-responsive liquid, i.e., so that an object of minimal weight will cause piston 16 to sink, thereby adapting the apparatus for weighing relatively light objects.

Electrically connected between surface 14 and bushing 24 by lead wires 37 and 38 is voltmeter 40 capable of reading fractional voltages. Voltmeter 40 is preferably precalibrated with a specific shear-responsive liquid composition to read in terms of the weight of an object placed on weighing pan 34 rather than volts.

Inasmuch as the changes in electrokinetic properties of a shear-responsive liquid vary as the temperature of the shear-responsive liquid varies, it is preferred that the electrical circuit utilized with the apparatus include temperature-compensating means. The simplest form of temperature-compensation consists of a resistor or series of resistors in parallel or series (as shown in FIGURE 1) with voltmeter 40 and the weighing apparatus. Resistor 42 has a positive temperature coefficient of resistance of the same magnitude as the negative coefficient of the shear-responsive liquid used, or conversely, depending on the particular shear-responsive liquid used.

In operation, object 44, which is to be weighed, is placed on weighing pan 34 to cause piston 16 to move downwardly, thereby shearing the shear-responsive liquid within cylindrical vessel 10 between surfaces 14 and 18. Since the rate at which piston 16 is moved downwardly and, therefore, the shear rate of the shear-responsive liquid is dependent upon the weight of object 44, the voltage generated by the shear-responsive liquid will be directly proportional to the weight of object 44. The weight of object 44 can be determined by observing voltmeter 40, which is calibrated in terms of weight.

Although this invention has been described in relation to a specific embodiment, it will be apparent that obvious modifications may be made by one skilled in the art without departing from the intended scope of this invention. One obvious modification would be to accomplish the electrical connection between surface 18 and lead wire 38 other than by using bearing 24 in electrically conductive relationship with rod 32, which is in turn in electrical conductive relationship with surface 18. For example, lead wire 38 may be connected directly to rod 32.

It will be apparent that piston 16 preferably moves axially with respect to surface 14 in order to maintain a constant shear rate per weight of object 44, and thereby obtain reproducible and accurate results. In any event, electrically conductive surfaces 14 and 18 must be maintained separated from one aonther during the operation of the apparatus. Piston 16 is guided for substantially axial movement with respect to surface 14 and is maintained substantially uniformly spaced from surface 14 by rod 32 extending through bushing 24. If desired, the apparatus may include longitudinal, insulating guides 46 within cup-shaped portion 12. Piston 16 fits closely within guides 46 and is thereby guided and supported for axial movement with respect to surface 14. Another suitable means for guiding piston 16 for axial movement with respect to surface 14 is to provide at least one vertical guide rod extending upwardly from the bottom wall of cup-shaped portion 12 into an aperture in piston 16, where it is slidably disposed. If only one such guide rod is used, it will be axially disposed within cup-shaped portion 12 and piston 16.

Cover portion 20 may be omitted from the apparatus provided that a suitable electrical connection is made between surface 18 and lead wire 38 as by connecting lead wire 38 to rod 32, and suitable guide means are provided for guiding piston 16 for axial movement with respect to surface 14, such as stringer-like guides 46.

Although cup-shaped portion 12 and piston 16 are illustrated as being cylindrical members fabricated of an electrically conductive material, various alternative structures of such members will be obvious. For example, cup-shaped portion 12 and piston 16 may be fabricated of electrically insulating materials with electrically conductive surfaces 14 and 18 laminated thereto, respectively, and means for connecting lead wires to surfaces 14 and 18. Surfaces 14 and 18 may be of shapes other than cylindrical, as for example, triangular, square, hexagonal, octagonal, etc, It is not essential that the shapes of surfaces 14 and 18 be the same. In fact, surfaces 14 and 18 of different shapes can be advantageously used to eliminate the need for separate means for guiding piston 16 for axial movement with respect to surface 14.

FIGURE 3 is a sectional view of an apparatus where surface 14 of cup-shaped portion 12 is cylindrical in cross-section and piston 16 having electrically conductive surface 18 is hexagonal in cross-section. Piston 16 is provided with electrically insulating corner-members 60 which are slidably received in longitudinal grooves 62 within cup-shaped portion 12.

The size of grooves 62 is exaggerated for the purpose of clarity. When object 44 is placed on weighing pan 34 piston 16 will be guided for axial movement with respect to surface 14 by corners 60 in grooves 62 and surfaces 14 and 18 will be maintained spaced from each other.

Electrically conductive surfaces 14 and 18 may be fabricated of the same metal or different metals. However, it is preferred that surfaces 14 and 18 be fabricated of dissimilar metals when the change in induced potential is utilized in determining the weight of object 44, since a greater D.C. potential is generated by using different metals than when the same metal is used for both surfaces.

As hereinbefore disclosed, electrokinetic properties other than induced potential may be utilized to determine the weights of objects in accordance with this invention. FIGURE 4 schematically illustrates a circuit for using the change in resistivity of the shear-responsive liquid as it is sheared. Referring to FIGURE 4, 0.48 volt D.C. potential source 70 and resistor 72 have a resistance of $10^3$ ohms are series connected between lead wires 37 and 38. Connected in parallel to resistor 72 is voltmeter 74, which is capable of reading fractional voltages. Voltmeter 74 is precalibrated to read in terms of weight, as is voltmeter 40 (FIGURE 1). It will be obvious that the weight reading on voltmeter 74 will change as the weight-induced shear rate of the shear-responsive liquid changes. Although specific values of the components of the circuit of FIGURE 4 are given, it will be apparent that components of other values may be used.

Although the invention has been illustrated as being comprised of a movable piston member within a tubular member, it will also be obvious that other modifications may be used. If electrically conductive surfaces 14 and 18 are cylindrical as illustrated in FIGURES 1 and 2, it will be obvious hat the weight of object 44 can be determined by utilizing suitable mechanical linkages for rotating piston 16 with respect to cup-shaped portion 12 in response to the addition of weight on pan 34. When one of the two members is rotated with respect to the other, a shear rate is developed which also is dependent upon the weight of the object placed on pan 34.

The shear-responsive compositions utilized in the apparatus and method of this invention form no part of the invention, and for the purpose of this specification and claims, the term "liquid" is intended to include liquids in the ordinary sense of the term, i.e., readily flowing compositions, and compositions of relatively high viscosity, i.e., those having a grease-like consistency at room temperature. In general, the shear responsive compositions will consist of at least about 1% by volume and preferably 5 to 48% by volume of particulate poorly-conducting materials dispersed in a non-polar oleaginous vehicle, which has a dielectric constant less than about 5. The poorly-conducting particles which may be either of piezoelectric or non-piezoelectric materials, have an average size in the range of about 0.001 to 5.0 microns diameter, preferably about 0.01 to 1.00 micron diameter. Finely divided silica (a non-piezoelectric material) is especially suitable for use in shear-responsive liquids. Examples of other poorly-conducting particles which may be used include aluminum octoate, aluminum oleate, aluminum stearate, barium titanate, calcium stearate, activated charcoal, crystalline D-sorbitol, lead oxide, lithium stearate, magnesium silicate, micronized mica, white bentonite, zinc stearate, vanadium pentoxide, basic aluminum acetate, etc.

The oleaginous vehicle in which the poorly-conducting particles are dispersed is preferably a refined mineral oil fraction having a viscosity within the range of about 50 to 300 SUS at 100° F., and an initial boiling point greater than about 500° F. However, a wide variety of non-polar oleaginous materials can be employed. Examples of suitable materials include white oils, lubricating oil stocks such as 80 vis neutral oil, transformer oils, synthetic oils resulting from polymerization of unsaturated hydrocarbons, alpha methyl benzyl ether, benzene, bromocyclohexane, chlorinated paraffin, dibenzyl ether, dichloroethyl ether, chlorinated or fluorinated hydrocarbons in the lubricating-oil viscosity range, N-butyl ether, silicate ester, toluene, etc.

Where volumes of the poorly-conducting particles in high concentrations are incorporated in the shear-responsive liquid, it is usually necessary to add a material to fluidize the mixture and keep the viscosity of the shear-responsive liquid at a reasonable level. For this purpose, varying amounts of a neutral surfactant can be incorporated to maintain the mixture of silica and vehicle as a fluid. Suitable neutral surfactants which may be used are selected from the polyoxyalkylene ethers, hydroxyethers, polyhydroxyethers and esters, as well as neutral sulfonates and other neutral surfactants. Other neutral polar organic materials such as $C_6$–$C_{30}$ mono- or polyhydric alcohols are suitable fluidizers. Suitable neutral fluidizers include glycerol monooleate, sorbitan sesquioleate, glycol monooleate, alkyl aryl polyether alcohols, sodium dialkylsulfosuccinate, hexyl ether alcohol, butyl Cellosolve, octyl alcohol and dodecyl alcohol. The neutral fluidizer may be added in quantities sufficient to fluidize the mixture of vehicle and particles, but usually not more than is necessary to obtain sufficient fluidity should be used. The amount added will seldom exceed about 25% by volume.

A variety of polar materials, including water, may be used to alter the properties of the shear-responsive liquid. Lower hydroxy-substituted hydrocarbons have been found to be highly efficient. Especially preferred are the aliphatic polyhydroxy-substituted hydrocarbons such as ethylene glycol. In general, activating material in the range of about 0 to 10% by volume will be added to the shear-responsive liquid.

The following readily flowing, shear-responsive liquid is set forth only as an example of one suitable fluid which may be utilized.

| | Wt. percent |
|---|---|
| Silica | 48.48 |
| Water (absorbed on the silica) | 6.18 |
| Glycerol monooleate | 17.75 |
| 80 vis neutral oil | 27.59 |

The embodiments of the invention in which an exclusive property or privilege is claimed are defined as follows:

What is claimed is:

1. A [weighing] device comprising two spaced members having electrically conductive opposing surfaces, one of said members being mounted for relative movement with respect to the other member with said electrically conductive surfaces maintained spaced from each other, means for confining a shear-responsive liquid exhibiting electrokinetic properties upon shear between said electrically conductive surfaces, movable support means for supporting an object [to be weighed], said support means being operatively connected to the movable member so as to cause movement of said movable member [at a speed proportional] *in response* to the [weight] *movement* of an object supported thereby, and the electrical circuit means including indicating means responsive to an electrokinetic property of said shear-responsive liquid connected to said surfaces, *the electrokinetic properties of said liquid being dependent upon the rate of movement of said object.*

2. A [weighing] device in accordance with claim 1 in which said movable member is a piston disposed within a tube having an electrically conductive interior surface.

3. A [weighing] device in accordance with claim 2 in which said piston is disposed for reciprocal movement within said tube.

4. A [weighing] device in accordance with claim 3 in which said tube is positioned such that the axis thereof is vertical.

5. A [weighing] device in accordance with claim 4 in which said support means is a platform supported by a rod above said piston.

6. A [weighing] device in accordance with claim 5 including means for guiding said piston for axial movement with respect to said tube.

7. A [weighing] device in accordance with claim 6 in which at least one of said opposing electrically conductive surfaces is cylindrical.

8. A [weighing] device in accordance with claim 7 in which both of said opposing electrical surfaces are cylindrical.

9. A [weighing] device in accordance with claim 8 in which said indicating means is a voltmeter.

10. A [weighing] device in accordance with claim 9 in which said circuit means includes a D.C. potential source and a resistor series connected between said electrically conductive surfaces, and said voltmeter is parallel connected with said resistor.

11. A [weighing] device in accordance with claim 9 in which said electrically conductive surfaces are fabricated of dissimilar metals.

12. A [weighing] device in accordance with claim 7 in which said piston is polygonal in cross-section.

13. A [weighing] device in accordance with claim 12 in which said tube includes longitudinal grooves along the interior surface thereof and electrically insulating corners of said piston are slidably disposed in said grooves.

14. A [weighing] device in accordance with claim 8 in which the space between said electrically conductive surfaces is about 0.005 to 0.100 inch.

15. A method for [weighing] *determining the rate of movement of* an object which includes disposing a shear-responsive liquid exhibiting electrokinetic properties upon shear in a confined space between opposing electrically conductive surfaces of two spaced members, one of said members being mounted for movement with respect to the other member, operatively connecting an object to be [weighed] *moved* to said movable member so as to cause movement of said movable member [at a speed proportional] *in response* to the [weight] *movement* of said object, and determining the [weight] *rate of movement* of said object by measuring a change in an electrokinetic property of said shear-responsive liquid, *the electrokinetic properties of said liquid being dependent upon the rate of movement of said object.*

16. A method in accordance with claim 15 in which the [weight] *rate of movement* of said object is determined by measuring the change in electrical resistance of said shear-responsive liquid.

17. A method in accordance with claim 15 in which the [weight] *rate of movement* of said object is determined by measuring the potential generated by said shear-responsive liquid.

*18. The device of claim 1 in which the support means is connected to the movable member so as to cause movement of the movable member at a speed proportional to the weight of an object supported by the support means.*

*19. The method of claim 15 in which the speed of movement of the movable member is proportional to the weight of the object.*

(References on following page)

References Cited

The following references, cited by the Examiner, are of record in the patented file of this patent or the original patent.

UNITED STATES PATENTS

| | | | |
|---|---|---|---|
| 3,309,915 | 3/1967 | McEuen et al. | 73—71.2 |
| 1,431,638 | 10/1922 | Dowling | 177—210 |
| 1,663,129 | 3/1928 | Hopkinson | 177—1 |
| 1,885,356 | 11/1932 | Karrar | 177—1 |
| 2,661,430 | 12/1953 | Hardway | 310—2 |
| 2,661,596 | 12/1953 | Winslow | 60—52 |
| 2,945,398 | 7/1960 | Mullarkey | 177—210 |
| 3,047,507 | 7/1962 | Winslow | 252—75 |
| 3,056,908 | 10/1962 | Estes et al. | 310—2 |
| 3,065,365 | 11/1962 | Hurd et al. | 310—2 |
| 3,104,334 | 9/1963 | Bradley et al. | 310—8.5 |
| 3,104,335 | 9/1963 | Shoor | 310—8.5 |

RICHARD B. WILKINSON, *Primary Examiner.*

G. H. MILLER, JR., *Assistant Examiner.*

U.S. Cl. X.R.

73—71.2; 177—210